UNITED STATES PATENT OFFICE.

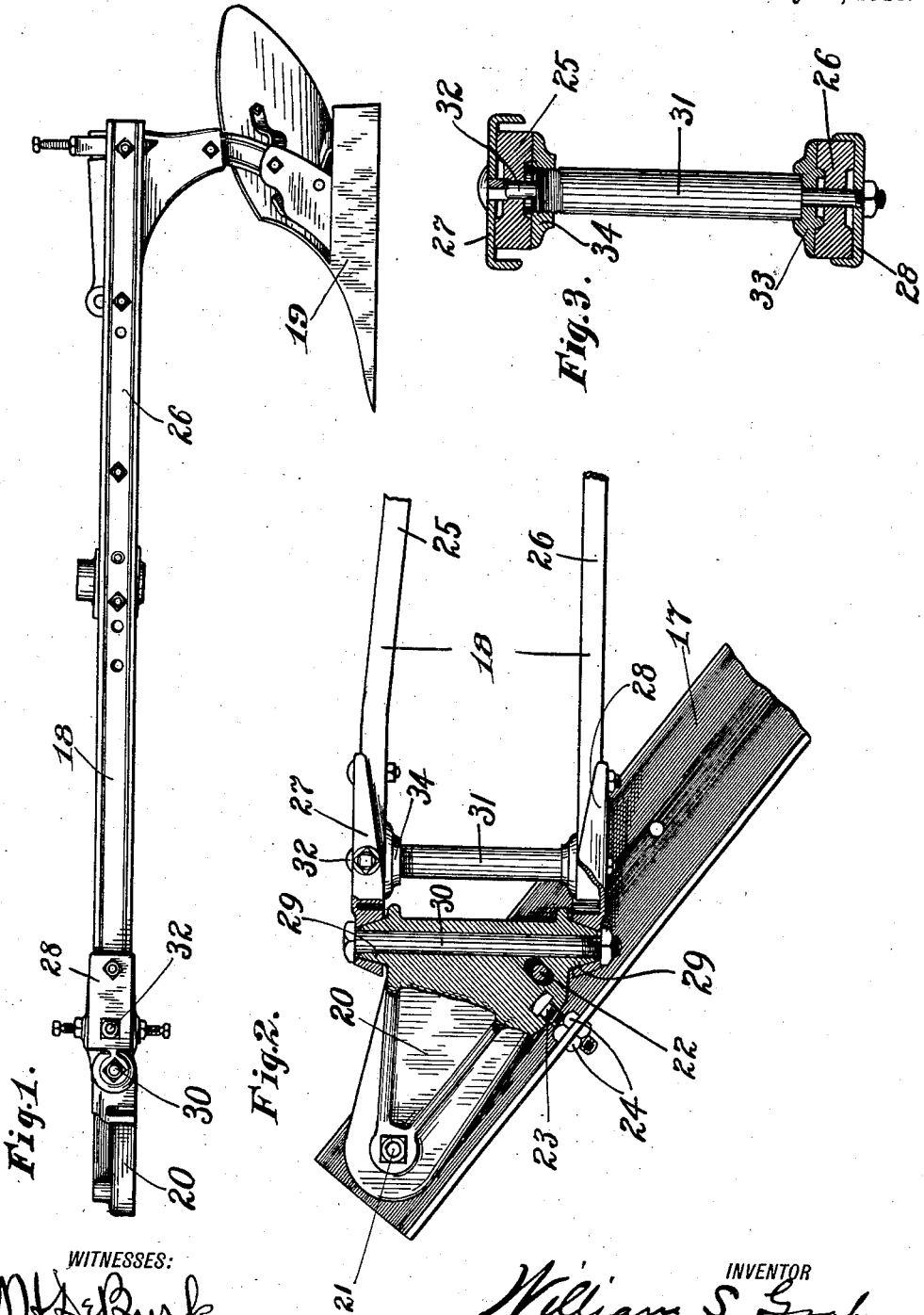

WILLIAM S. GRAHAM, OF CANTON, ILLINOIS, ASSIGNOR TO PARLIN AND ORENDORFF COMPANY, OF CANTON, ILLINOIS, A CORPORATION OF ILLINOIS.

GANG-PLOW.

1,068,761.      Specification of Letters Patent.      Patented July 29, 1913.

Application filed December 26, 1912. Serial No. 738,648.

*To all whom it may concern:*

Be it known that I, WILLIAM S. GRAHAM, a citizen of the United States, residing at Canton, in the county of Fulton and State of Illinois, have invented certain new and useful Improvements in Gang-Plows, of which the following is a specification, reference being had to the accompanying drawings.

This invention relates to gang plows and it has for its object the provision of new and improved means for attaching the beams to the cross-bar of the plow in such a manner as to make possible an adjustment of the parts to compensate for wear thereon, whereby the several plow shares may be kept adjusted properly relative to each other. The means by which I have accomplished this object are illustrated in the accompanying drawings and are hereinafter specifically described.

That which I believe to be new is set forth in the claims.

In the drawings,—Figure 1 is a side view of a plow beam equipped with my improvements; Fig. 2 is a top view, partly in section, of the means by which the plow beam is connected to the diagonal cross-bar of the frame; and Fig. 3 is a view, partly in section, of the adjustable means by which the bars of one of the plow beams are spaced apart.

Referring to the several figures of the drawings in which corresponding parts are indicated by the same reference characters,— 17 indicates the diagonal cross bar of a gang plow having mounted upon it as hereinafter described a plow beam 18 provided at its rear end with a plow share 19.

20 indicates a bracket pivotally mounted at its forward end by means of a bolt 21 to the cross-bar 17.

22 indicates a bolt passing through the cross-bar 17 and through a slotted opening in the bracket 20 at its rear end.

23 indicates an anchor bolt mounted in the vertical flange of the cross-bar 17 being secured adjustably in position therein by means of nuts 24.

As will be readily understood, by loosening the bolts 21 and 22 the bracket 20 may be swung laterally about the bolt 21 to any desired adjusted position to bring the plow share 19 into proper position relative to the plow share (not shown) next adjacent thereto. The bolt 23 is then adjusted to bring its head into contact with a part of the bracket 20 and the bolts 21 and 22 are properly tightened whereby the bracket 20 is held very firmly in its adjusted position.

As best shown in Figs. 1 and 3, the plow beam 18 comprises two bars 25—26 spaced apart and clamped together by suitable means of any approved type.

27—28 indicate coupling plates secured to the forward ends of the bars 25—26 respectively. As best shown in Fig. 3, the openings in the forward ends of the coupling plates 27—28 are substantially conical to conform to the shape of bosses 29 formed on the rear end of the bracket 20, upon which bosses said coupling plates are pivotally mounted.

30 indicates a bolt passing through a suitable opening through the bracket 20, through the bosses 29, and through the conical openings of the plates 27—28, serving to tighten the coupling plates 27—28 properly upon the bosses 29.

The bars 25—26 making up the plow beam 18 are spaced apart by means of a sleeve 31. As best shown in Fig. 3, a bolt 32 passes through suitable openings in the bars 25—26 and plates 27—28 immediately in rear of the forward ends of the bars 25—26, upon which bolt said sleeve 31 is mounted between the bars 25—26.

33 indicates a bearing-plate of any suitable design spaced between the end of the sleeve 31 and the bar 26, and 34 indicates a bearing-plate screw-threaded upon the opposite end of the sleeve 31 providing a bearing at that end of said sleeve upon the bar 25.

As best shown in Fig. 2, the conical openings through the plates 27—28 are designed to be of such a size relative to the bosses 29 that the outer faces of the plates 27—28 extend a short distance beyond the outer faces of the bosses 29. As the bosses 29 and the coupling plates 27—28 become worn through extensive use the bearing-plate 34 may be given a few turns from time to time upon the sleeve or spacing-block 31 and the nuts tightened upon the bolts 30 and 32 bringing the forward ends of the plates 27—28 closer together to compensate for this wear, as will be readily understood.

What I claim as my invention and desire to secure by Letters Patent is,—

1. In a gang plow, the combination of a frame, a plow beam, a plow share carried thereby, a bracket mounted on said frame and provided with conical bearings, coupling plates mounted on the forward ends of said plow beam and provided with openings corresponding to the shape of said conical bearings whereby said plow beam is pivotally mounted upon said bracket, a spacing block and a nut mounted thereon serving to hold said coupling plates adjustably apart, and a bolt securing said coupling plates in position upon said conical bearings.

2. In a gang plow, the combination of a frame, a bracket secured thereto provided with conical bearings, a plow beam comprising two bars spaced apart, a plow share carried by said plow beam, a coupling plate mounted on the forward end of each of said bars, said coupling plates being provided with openings corresponding to the shape of said bearings whereby said plow beam is pivotally mounted upon said bracket, an adjustable spacing block mounted upon said bars holding said coupling plates adjustably apart, and adjustable means binding said coupling plates upon said bearings.

3. In a gang plow, the combination of a frame, a bracket mounted thereon provided with conical bearings, a plow beam comprising two bars spaced apart, a plow share carried by said plow beam, a coupling plate mounted on the forward end of each of said bars, said coupling plates being provided with openings corresponding to the shape of said bearings whereby said plow beam is pivotally mounted upon said bracket, a bolt passing through suitable openings in said coupling plates and said bars a short distance in rear of said bracket, a bearing-plate mounted on said bolt, a sleeve mounted on said bolt bearing at one end against said bearing-plate, a second bearing-plate screw-threaded upon the opposite end of said sleeve and said bearing-plates serving as a spacing block for adjustably spacing said coupling plates apart, and a bolt for securing said coupling plates adjustably in position upon said conical bearings.

4. In a gang-plow, the combination of a frame, a plow-beam, a furrow-opener connected to said plow-beam, pivotal connections between said frame and said plow-beam comprising conical bosses mounted on one of said parts with which correspondingly-shaped openings of the other part engage, means for adjustably holding said bosses in engagement with said openings, and an adjustable spacing block adapted to limit the extent to which said bosses enter said openings.

WILLIAM S. GRAHAM.

Witnesses:
FRED L. DEWEY,
GEO. S. HAMILTON.